2,778,818
AZO NITRILES CONTAINING BETA-HYDROXYALKYL SUBSTITUENTS

Archibald Miller Hyson and Ralph Courtenay Schreyer, Wilmington, Del., assignors to E. I. du Pont de Nemours and Company, Wilmington, Del., a corporation of Delaware No Drawing. Application August 18, 1954, Serial No. 450,801

7 Claims. (Cl. 260—192)

This invention relates to new aliphatic azo compounds containing beta-hydroxyalkyl groups and the use thereof in addition polymerization.

In addition polymerization processes catalysts hitherto most frequently mentioned in the art and also most widely used are in general peroxidic compounds, e. g., benzoyl peroxide, ammonium persulfate, etc. The peroxide catalysts have certain disadvantages, e. g., discoloration of polymer, decoloration of dye stuffs added to monomer prior to polymerization, insolubilization of the polymer, etc. The peroxidic compounds in themselves are furthermore very unstable and hazardous, giving rise to explosion hazards. Another class of compounds used as initiators or catalysts for the polymerization of ethylenically unsaturated compounds are azo compounds. The azo compounds, especially the symmetrically substituted azo compounds, such as described in U. S. Patent 2,471,959 are very reactive compounds and hence in comparison to most peroxides require different conditions and equipment for the polymerization of monoolefinic compounds.

This invention has as an object the preparation of new aliphatic azo compounds. A further object is the provision of new catalysts for the polymerization of ethylenically unsaturated compounds. Yet another object of this invention is the provision of catalysts or initiators, which have reactivities similar to those of the peroxygen catalysts, for the polymerization of ethylenically unsaturated compounds. Other objects will appear hereinafter.

These objects are accomplished by the invention of azo compounds wherein the azo, —N=N—, group is bonded on one side to a beta-hydroxyalkyl group, and on the other to a carbon atom which is tertiary, i. e., attached to three other carbon atoms by single valences, one of the carbon atoms bonded to said tertiary carbon being part of a cyano group and the other two carbon atoms bonded to said tertiary carbon being part of the same or distinct aliphatic hydrocarbon groups.

It has now been discovered that compounds of the class described herein above act as catalysts in the polymerization of ethylenically unsaturated compounds, under conditions and in equipment which approximate the conditions and equipment used for many peroxygen type catalysts. Thus disadvantages of peroxygen catalysts described hereinabove are avoided without changing the reactivity or effectiveness of the polymerization system.

The class of compounds of this invention may be prepared by several methods. They may be prepared by the reaction of a ketone with the beta-hydroxyalkyl hydrazine in the presence of a cyanide in an aqueous medium, said reaction giving rise to a hydrazonitrile, which then on mild oxidation will give rise to the desired azonitrile. The reaction of a ketone with a hydrazine in the presence of a cyanide compound has been described by Thiele and Heuser in Am. 290,140 (1896) by Hartman in Rev. Trav. Chim. 46,150 (1896) and by Dox in J. Am. Chem. Soc. 47,1471 (1927). A preferred method of obtaining hydrazonitriles has been described in U. S. Patent 2,469,358.

The amounts of the class of azo catalysts of this invention employed can vary within wide limits depending on the type of polymerization to be performed, although generally 0.05 to 1% based on the monomer are preferred.

The following examples in which the parts given are by weight further illustrate the practice of this invention.

Example 1. — 2-(2'hydroxyethyl azo)-2-4-dimethyl valeronitrile. A glass container was charged with 3.95 moles of 2-hydroxyethylhydrazine and 3.95 moles of methylisobutylketone was added under agitation at 50 to 57° C. over a period of 90 minutes. The reaction product was then cooled to room temperature and allowed to stand for a period of 16 hours and then distilled at a temperature of 110° C. to 114° C. and at a pressure of 5 mm. to give the hydrazone. The yield of the product was 96% based on the beta-hydroxyethyl hydrazine. (Analysis calculated for: C, 60.76%; H, 11.39%; N, 17.72%. Found: C, 60.86%; H, 11.42%; N, 17.93%.)

The resulting hydrazone was cooled to 0° C. in an ice bath and 3.6 moles of hydrocyanic acid to 3.0 moles of the hydrazone was added under agitation without permitting the temperature of the reaction mixture to rise above 20° C. After a reaction time of 4 hours, the reaction mixture was transferred to another flask surrounded by a dry ice bath and containing 180 grams of acetic acid, 1140 ml. of water, and 1140 ml. of methylene dichloride. The reaction mixture was cooled to —5° C. and 3.75 moles of chlorine was passed into the mixture over a period of 90 minutes. During the addition of the chlorine the temperature was maintained at 0 to —5° C. After addition of the chlorine, unreacted chlorine present in the reaction mixture was neutralized by the addition of 10 grams of sodium bisulfite. The methylene dichloride layer of the reaction mixture was separated and washed with water and saturated NaHCO₃ solution. On evaporation of the methylene dichloride, 2-(2'-hydroxyethylazo)-2,4-dimethyl valeronitrile was obtained. The product was purified by solution in water followed by filtration and extraction with benzene and evaporation of the benzene. A 40% yield of the pure compound having the formula

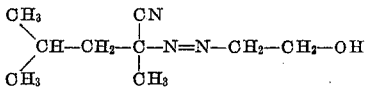

was obtained.

*Analysis.*—Calc. for: C, 59.00%; H, 9.29%; N, 22.9%. Found: C, 58.78%; H, 9.19%; N, 23.20%.

Using the same procedure the following ketones were used to prepare the following azo nitriles using 2-hydroxy ethyl-hydrazine:

| Ketones | Nitriles |
|---|---|
| Cyclohexanone | 2-(2'hydroxyethylazo) cyclohexyl-carbonitrile. |
| Acetone | 2-(2'hydroxyethylazo)-2-methyl-propionitrile. |
| Diethylketone | 2-(2'hydroxyethylazo)-2-ethyl-butyronitrile. |
| Methyl ethyl ketone | 2-(2'hydroxyethylaz))-2-methyl-butyronitrile. |
| Ethyl butyl ketone | 2-(2'hydroxyethylazo)-2-ethyl-capronitrile. |

Example 2.—A stainless steel pressure resistant vessel was flushed with nitrogen and charged with 48 parts of benzene and 92 parts of water. The reactor and contents were heated up to 170° C. Ethylene was added until the total pressure was 800 atmospheres and 14 parts of water containing 0.084 part of 2-(2'-hydroxyethylazo)-2,4-dimethyl valeronitrile were thereupon injected in 6 equal portions (at 5 minute intervals) into the reaction mixture. The reaction mixture was agitated by rocking the bomb for 35 minutes while pressure and temperature were maintained. At the end of this period the temperature was lowered and the ethylene bled off. The polymer obtained from the reaction mixture was air dried to give 15.3 parts of ethylene polymer.

*Example 3.*—A glass vessel was charged with 100 grams of para-xylene having therein dissolved 0.2 gram of 2-(2'hydroxyethylazo)-2-ethyl butyronitrile and 50 grams of styrene were added under a blanket of nitrogen. The mixture was then heated to 138° C. and kept at that temperature under nitrogen for a period of two hours. The reaction mixture was then poured into 500 grams of methanol, which caused the precipitation of the polymer formed. The polymer was filtered and air dried and a yield of 38.8 grams of polystyrene was obtained. The experiment was repeated in the absence of 2-(2'-hydroxyethylazo)-2-ethylbutyronitrile and upon filtration and drying only 15.1 grams of polystyrene were obtained.

While in the foregoing examples the process is disclosed as applied to the synthesis of a 2-hydroxyethylazo compound, it is to be understood that the same procedure can be followed in making corresponding 2-hydroxyalkylazo compounds, such as $$R_1R_2C(CN)-N=N-(2\text{-hydroxypropyl})$$

The azo compounds of this invention may be represented by the general formula

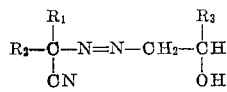

where $R_1$ and $R_2$ are alkyl radicals of 1 to 7 carbon atoms such as methyl, ethyl propyl, isopropyl, butyl, etc. or where $R_1$ and $R_2$ may combine to form a cyclic structure such as cyclohexane, and where $R_3$ may be either a hydrogen or a methyl group. These compounds are conveniently prepared by reacting a ketone of the class $R_1COR_2$ where $R_1$ and $R_2$ are as above stated with the 2-hydroxyalkyl hydrazine as described hereinabove to give the hydrazone and obtain therefrom the hydrazonitrile and finally the azonitrile.

In addition to the use of these azo compounds as initiators for the polymerization of ethylenically unsaturated compounds, they are useful as intermediates for the preparation of other compounds. Although the class of compounds of this invention have reactivities similar to peroxygen compounds, they do not exhibit the disadvantages of the peroxygen compounds such as discoloration of polymer, oxidation of added coloring material, etc. Another useful application of said class of compounds is as blowing agents for the preparation of foamed plastic materials.

We claim:

1. An azo compound having the following general formula

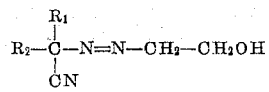

wherein $R_1$ and $R_2$ are alkyl radicals having from 1 to 7 carbon atoms.

2. A compound as set forth in claim 1 in which the aliphatic hydrocarbon groups are methyl and isobutyl groups.

3. A compound as set forth in claim 1 in which the aliphatic hydrocarbon groups are methyl groups.

4. A compound as set forth in claim 1 in which the aliphatic hydrocarbon groups are ethyl groups.

5. A compound as set forth in claim 1 in which the aliphatic hydrocarbon groups and said tertiary carbon atom combined form a cyclohexane ring.

6. A compound as set forth in claim 1 in which the aliphatic hydrocarbon groups are methyl and ethyl groups.

7. A compound as set forth in claim 1 in which the aliphatic hydrocarbon groups are ethyl and butyl groups.

References Cited in the file of this patent

UNITED STATES PATENTS

| | | |
|---|---|---|
| 2,471,959 | Hunt | May 31, 1949 |
| 2,666,758 | Johnson | Jan. 19, 1954 |